Jan. 7, 1941.                    W. H. MILLER                    2,228,176
                        FASTENER FOR COUPLINGS AND THE LIKE
                              Filed Aug. 18, 1938
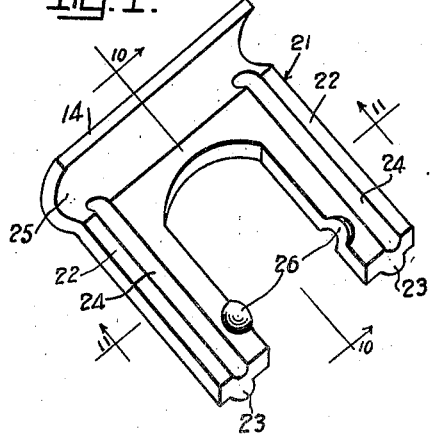
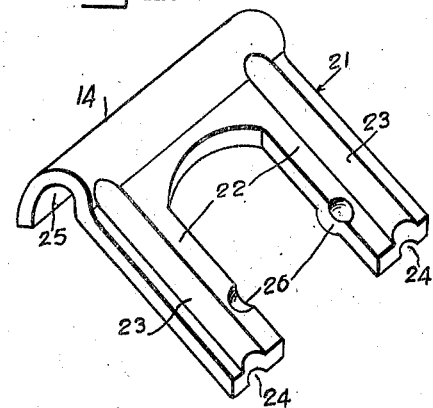
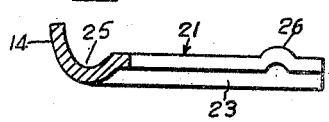
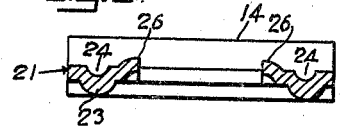
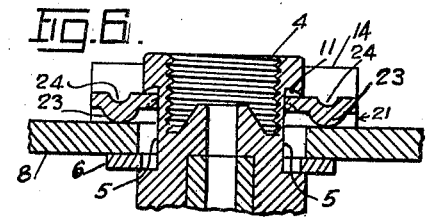
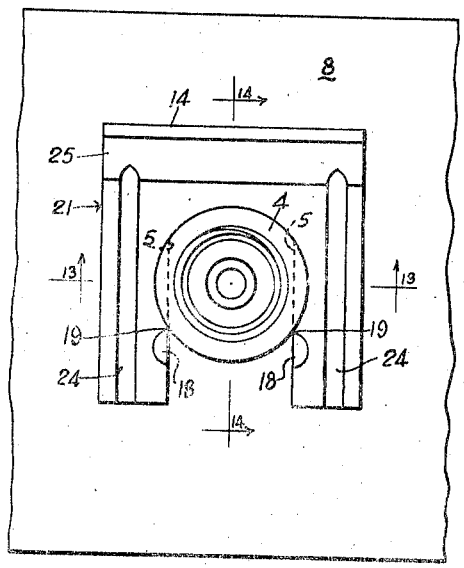
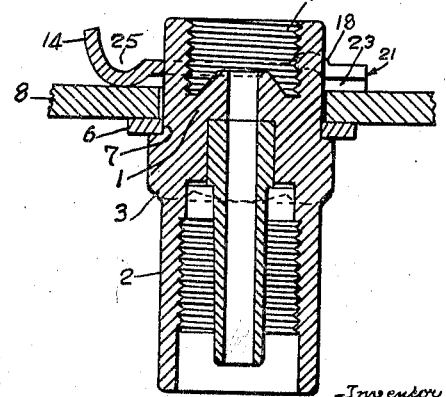
Inventor
William H. Miller,
By Toulmin & Toulmin
Attorneys Patented Jan. 7, 1941

2,228,176

UNITED STATES PATENT OFFICE 2,228,176

FASTENER FOR COUPLINGS AND THE LIKE

William H. Miller, Royal Oak, Mich., assignor to The Flex-O-Tube Company, Detroit, Mich., a corporation of Delaware Application August 18, 1938, Serial No. 225,593

1 Claim. (Cl. 285—25)

This invention relates to devices for attaching members to supports.

The invention relates more particularly to the fastening device itself for detachably securing pipes or the like conduits, such as commonly employed for conveying hydraulic brake fluid in a braking system, to a rigid support, for instance a wall, panel, bracket, or other attaching element. It will be understood, however, that the invention is not limited to the attachment of brake tubing and hose conduits, but may be used for fastening various members, both solid and tubular, to a suitable support.

Metal tubing, such as copper, bronze, aluminum, lead, tin, etc. is employed in the construction and equipment of various types of machinery, for instance automotive, aeronautical and locomotive, for conveying oil, gasoline, water and hydraulic brake fluid from a supply source to different parts of the machine. In this connection it has been found desirable in practically all instances to limit the lengths of the metal tubing because during operation of the machine the tubing is subjected to vibration, bending stresses and whipping action, which accelerate the ultimate cracking and failure of the pipe or conduit. This necessitates that the tubing be rigidly supported at intervals along its length. Further it is common practice to incorporate in machinery of this type conduits which comprise sections of flexible hose and metal tubing which are connected together by separable couplings. The couplings require a support to prevent undue load or stress being exerted on the tubing in order to prolong its life.

In the construction of the machines comprising the aforementioned conduits, it is customary to provide a bracket or panel member upon which the coupling or tubing section may be mounted and firmly supported. It has also been found desirable to construct the supporting means so that it may be readily detached from the tubing or coupling when replacement or repair of the same is needed.

The principal object of this invention is to provide a novel fastener which affords an economical and highly efficient means for detachably mounting the tubing or coupling upon a bracket or supporting element of the machine.

Another object is to provide an efficient fastener for rigidly maintaining the tubing firmly and which may be readily removed and replaced without substantially marring or injuring the face of the bracket or panel upon which the tubing or coupling is supported.

Another object is to provide a fastener which is of rigid construction and which functions as a wedge for holding the tubing and adjacent parts securely together at all times.

Another object is to provide a novel fastener which is of reinforced construction which is not readily distorted in use, and is substantially inflexible.

Other objects and advantages of this invention will be apparent to those skilled in the art during the course of the following description.

The preferred embodiments and modifications of this invention are illustrated in the accompanying drawing, wherein:

Figure 1 is a perspective view of another form of the fastener device of this invention;

Figure 2 is a perspective view of the reverse side of the device shown in Figure 8;

Figure 3 is a sectional view thereof taken along the line 10—10 of Figure 1;

Figure 4 is a sectional view thereof taken along the line 11—11 of Figure 1;

Figure 5 is a front elevation view of the assembled fastener shown in Figure 1 and a tubular coupling maintained thereby;

Figure 6 is a sectional view taken along the line 13—13 of Figure 5, looking in the direction of the arrows;

Figure 7 is a sectional view taken along the line 14—14 of Figure 5, looking in the direction of the arrows.

Referring to the drawing in detail:

The fastener 21 illustrated in Figures 1 to 4 is of rigid U-shaped construction, wherein there is provided a coupling of the conventional compression pipe type, that includes a body portion 1 having an elongated internally threaded end portion 2 for affording connection to a flexible conduit, not shown, and a central hexagonal section 3 applicable for accommodating a wrench. The opposite end of the coupling body comprises a threaded nipple 4 which is adapted to receive and provide a fluid-tight connection with the pipe section attached thereto. Referring to Figure 5 the nipple 4 is provided with internal grooves 5 formed transversely of the axis of the tubing and on diametrically opposite sides thereof. The grooves 5 may extend from the hexagonal portion 3 along the pipe or be spaced therefrom. On the nipple 4 and abutting against the hexagonal section 3 is a washer 6 which is preferably driven or "forced fit" upon the shoulder 7 to provide a collar or backing for the bracket plate or panel 8.

The tubing or coupling is rigidly held against the bracket 8 by the novel readily removable fastener shown in Figures 1 and 2 with which this invention is particularly concerned. The pipe coupling nipple 4 extends through an aperture in the bracket 8 which may be of any desired shape and arranged to accommodate the end of the nipple of the tubing and presents a smaller opening than the outside diameter of the washer 6 in order to be retained thereagainst. In some instances the collar 6 may be omitted where the hexagonal portion 3 is of a sufficient diameter to provide ample backing support for the bracket 8.

The grooves 5 on the nipple 4 are of such depth and length with respect to the thickness of the pipe wall and bracket that when the parts are assembled as illustrated in Figures 5 and 6, there will be just sufficient space provided for forcibly wedging the fastening member in place between the bracket and undercut groove wall portions 11. It is preferable to undercut the grooves 5 as at 11, but it will be understood that this is optional and in some instances this undercut may be omitted. Moreover, the grooves 5 may comprise a single groove which extends all around the member 4, or a plurality of diametrically opposed grooves or cut-away portions may be provided therearound. In the figures the spaced leg members 22 are essentially flat rectangular flange elements having a bead or ridge 23 extending centrally along the back side of the members parallel to their longitudinal axis. Opposite the bead and on the front side are corresponding grooves or channels 24 as more fully shown in Figures 1 and 2.

The plane across the surface of the beads 23 coincides with that of the upper flange portion 25, as illustrated in Figure 4, so that the back side of the fastener will lie flat against the bracket 8 when employed for fastening the coupling to the supporting plate member. The inner extremities of the leg members 22 are provided with knobs or raised lugs 26 for locking the fastener in place. The construction of the fastener as illustrated in Figures 1 to 4 produces an inflexible, rigid, reinforced fastener, which may be removed and replaced many times without undue wear or loss of its efficiency as a fastener.

It will be appreciated, of course, that this invention is not limited to the exact details of construction and use, since obvious modifications within the scope of this invention may be made by persons skilled in the art without departing from the spirit or scope of the claim appended hereto.

Having thus fully described my invention, what I claim as new and desire to secure by Letters Patent is:

In a device for securing a grooved tubular coupling to a support, comprising a rigid U-shaped sheet metal member having straight parallel legs spaced to fit in the grooves of said tubular coupling, both of said legs being corrugated along their longitudinal axes to provide ribs for engaging with the support, means for locking said device to said coupling comprising pressed up knobs on the inner sides of said legs, said knobs being adapted to be forced through the grooves in the coupling, and whereby the legs engaging the ends of the walls of the grooves prevent disengagement of the legs from the grooves.

WILLIAM H. MILLER.